Patented Nov. 14, 1944

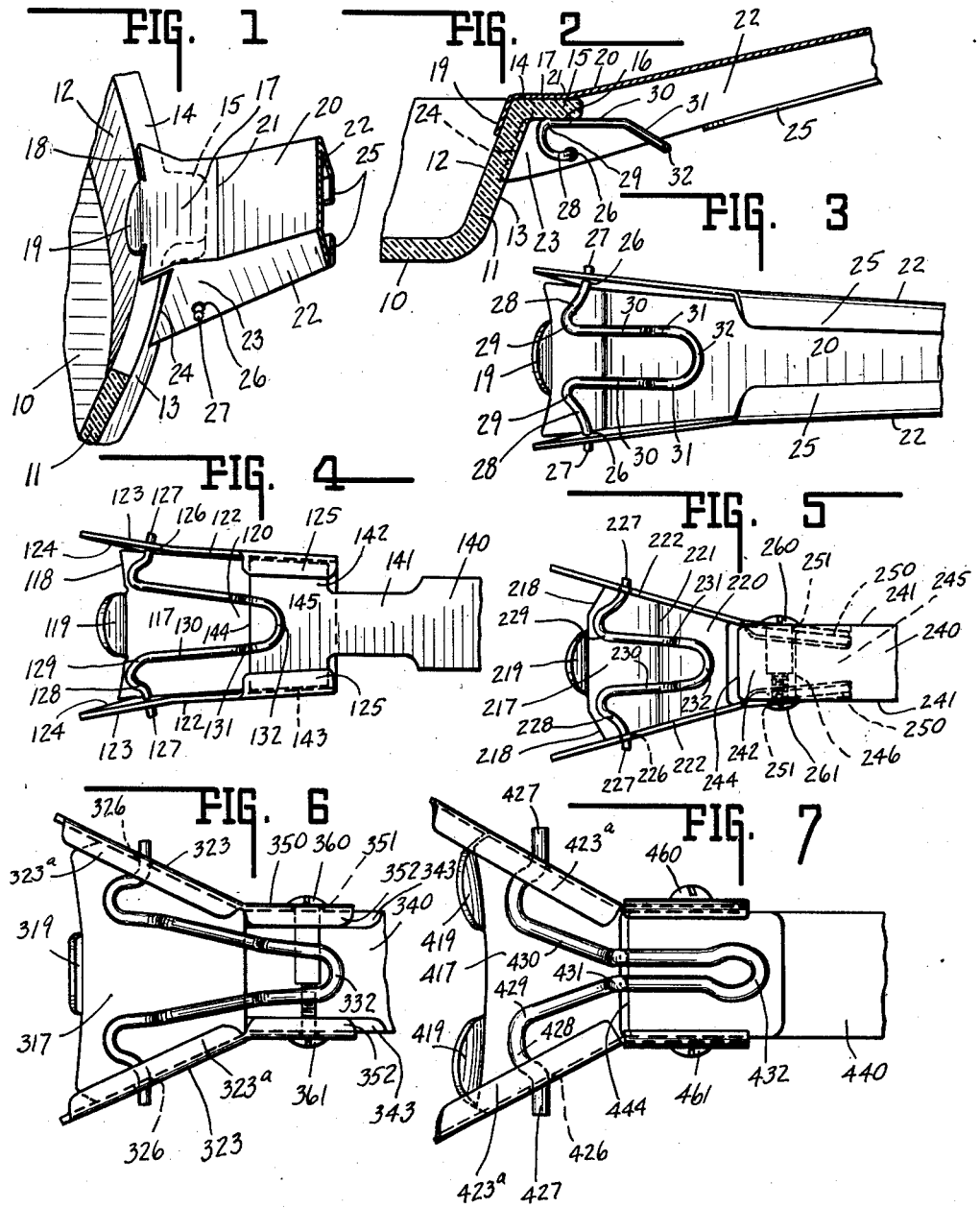

2,362,720

UNITED STATES PATENT OFFICE 2,362,720

DETACHABLE HANDLE FOR OPEN VESSELS

James H. Reichart, Muncie, Ind.

Application January 21, 1943, Serial No. 473,130

4 Claims. (Cl. 294—31)

This invention relates to a detachable handle for a vessel to transform same to a long handled vessel or for transporting a vessel that has no handle long enough for the hand to grasp or hold for that purpose.

One chief object of this invention is directed to the foregoing and more particularly when the vessel is of glass, especially when used for cooking, baking and like purposes, although same is not restricted to such purposes nor to such material.

Another chief object of the present invention is to provide in a handle of the aforesaid character, a hand grip portion and a vessel grip portion and detachably connect the same together for hand grip portion replacement and like purposes.

The chief features of the present invention reside in the formation of the structures capable of accomplishing the foregoing objects.

Other objects and features of the invention will be set forth more fully hereinafter.

The full nature of the invention will be more fully understood from the accompanying drawing and the following description and claims.

In the drawing,

Fig. 1 is a perspective view of a portion of a vessel herein illustrated as of glass character and having a cooperating lug and a portion of a handle embodying the invention applied thereto.

Fig. 2 is a central longitudinal sectional view of the aforesaid.

Fig. 3 is a bottom plan view of the handle only, the free end being broken away.

Fig. 4 is a similar view of a modified form of handle wherein the hand grip portion is detachable from the vessel engaging portion.

Fig. 5 is a similar view of another embodiment of a detachable grip handle, the clamping member being of nestable type.

Fig. 6 is a similar view of a still further embodiment of a detachable grip handle, the clamping member herein being extended for finger engagement.

Fig. 7 is a similar view of a further modification and more particularly of that form illustrated in Fig. 6.

In Figs. 1 and 2, 10 indicates the bottom of a vessel, herein illustrated as of glass. 11 indicates the side wall thereof having the interior face 12 and the exterior face 13. This wall slopes inwardly toward the bottom and at its upper end terminates in the top edge or face 14. Herein, projecting outwardly from the upper edge of the wall and from the exterior thereof, is the projecting lug or handle stub 15 integral with the side wall 11 and having the under face 16.

The vessel mounting portion of the handle includes the upper face overlying flange portion 17, preferably having an inner edge 18 conforming to the interior 12 of wall 11. Depending therefrom and parallel, if wall 11 is flat, or concentric if wall 11 is curved as shown, is one or more tongues 19.

Herein portion 17 is extended as at 20 and this is slightly angular to portion 17, "breaking" at 21. This portion 20 in Figs. 1 to 3 extends to the free end of the handle. Depending from each side edge of portion 20 is side wall 22. This is extended forwardly toward and herein is connected to the rearward portion of portion 17 as at 23 and has a forward edge 24 inclined and conforming to exterior 13 of wall 11.

The two edges or faces 24 engage exterior 13 in spaced relation. Herein singular lip or tongue 19 engages the interior wall 12 therebetween and said faces and lip with overlying portion 17 form a groove as it were to nest therein wall 11 of the vessel. To provide a smooth handle as well as stiffen and reenforce same, the side portions 22 are provided with inwardly projecting flanges 25. In effect there is produced a tubular handle.

Reference will now be had to the retention and clamping structure necessary to retain the aforesaid handle upon the vessel. Herein each portion 23 is provided with a circular aperture 26 forming aligned bearings for the aligned but oppositely directed ends 27 of the clamp member. Extending inwardly and forwardly of each end is a portion 28 that is then directed upwardly and rearwardly as at 29. The upper faces of these two portions 29 are adapted to wipingly and hence frictionally engage the flat under face 16 of lug 15.

The adjacent ends of portions 29 are parallel and are extended as at 30, and angular extensions 31 thereof are connected by the curved portion 32. Portions 31—32—31 form an outwardly directed finger engageable portion for tilting the clamp member of resilient character into and out of lug clamping engagement when the handle is mounted on the vessel.

As shown in Figs. 2 and 3, this clamping member, except for its exposed ends 27 and finger engageable midportion 32, is concealed or nested as it were in the socket formation of the handle adjacent the groove portion thereof.

When it is desired to apply the handle it is grasped in the usual manner and applied to the vessel so the side wall thereof is fully seated in the groove. The index finger may permit the clamp to extend downwardly but neither engage the vessel. When so mounted, retraction movement of the index finger causes the clamp to nest within the socket formation and engage lug 15.

Since the clamp is of resilient character initial nesting movement causes the junctions of portions 28 and 29 to engage face 16 of lug 15. Further nesting forces these portions forwardly and upwardly so that portions 29 wipingly engage said face and frictionally lock thereon holding the clamp in lug clamping position. The result is the vessel when groove seated is locked by the clamp to the handle and vice versa and by yielding action of the clamp, the bearings holding the clamp in position for such action.

Referring to Fig. 3, observe that portions 30 are substantially parallel (clamped position). However, when the clamp is otherwise positioned these portions slightly diverge from each other and the midportion. This is set forth by way of explanation of the peculiar action of the resilient clamping member.

In Fig. 4 a modified form of the invention is illustrated. Numerals of the one hundred series indicate parts identical or similar to parts illustrated in Figs. 1 to 3 and indicated by the corresponding primary numerals. This form of the invention differs from that initially described by having the hand grip portion detachable from the socket and groove formation portions and by utilizing the clamping member offset portion as a hand grip portion retainer or stop, all without loss of the other functions thereof.

Herein (Fig. 4) the flanges 125 on side walls 122 form therewith a rearwardly directed tapering socket with portion 120. The clamp has portions 131 angular in direction and joined by U-shaped connecting portion 132 that is slightly inclined for finger engagement. Hand grip portion 140 has a reduced neck 141 and a wedge shaped head 142, the side face edges of which are slightly rounded where they meet, same being indicated at 143. The head has forward face 144 and a lower face 145 exposed between flanges 125.

This head has a friction wedge fit in the aforesaid socket, but cannot bind at the corners thereof because of the head corner relief 143. Friction lock, accordingly, is between flat adjacent faces. The angular offset portions 131 of the clamping member have their forward portions abut face 144 and their adjacent portions underlying face 145 of said head when the clamp member is in clamping position. Hence, this member prevents possible detachment between the detachable parts. The downward inclination of portion 132 facilitates finger engagement for entire handle release when desired.

Reference will now be had to Fig. 5. Similarly herein numerals of the two hundred series are employed. This form has its edges 213 slightly different in shape. The clamping member when in clamping position is fully nested in the socket formation. Herein each socket side wall 222 includes a rearwardly tongue 250. These tongues are arcuate in transverse section and are directed or inclined towards each other. Each is apertured at 251 and the apertures are in alignment.

The hand grip portions 240 of the handle is provided with an anchoring end or head 242. In each of the parallel sides 241 thereof there is provided a recess 243. These recesses have their rearward ends closer together than their forward or outer ends so that the intermediate portion 245 is wedge shape. Extending from recess to recess and through the wedge portion is a slot 246 opening on opposite ends on the recessed faces. This slot may be a hole or may be a notch extending from end 244 of the grip portion which may be of handle or pistol grip type as desired.

When the hand grip is of glass the slot form is preferred. When of molded plastic, the slot or hole form may be utilized. When of wood, the hole form (drilling being easiest) is preferred. A separable fastener such as a female threaded headed member 260 and a male threaded headed member 261 extend through apertures 251 in ears or tongues 250 and when screwed together with the tongues 250 nested in the recesses 243 the several parts are rigidly secured together. This type of connection has many supplementary advantages, the aggregate of which is a resulting rigid connection.

Reference will now be had to Fig. 6 wherein numerals of the three hundred series are utilized. Herein the tongues 350 are apertured at 351 and, instead of being arcuate in section as in Fig. 5, are U-shaped in section having upper and lower inwardly directed flanges 352. The handle 340 is grooved at each corner edge as at 343 to nest the flange 352. The clamping bolt structure 360—361 secures the handle parts rigidly together. The central finger engageable portion 332 of the clamp member lies below the hand grip portion anchored end when the clamping member is in clamping position. The latter being of larger diameter than those shown in Figs. 1 to 5, inclusive, there, accordingly, is provided elongated apertures 226, instead of circular ones as in said figures.

This form also includes, when desired, reenforcing flanges 323a on side members 323.

In Fig. 7 numerals of the four hundred series are similarly employed. In this form two lips 419 are employed. Even heavier stock is utilized in the clamping member. The same also applies to the sheet metal used to form the groove and socket portions. This handle is intended to be used with large heavy vessels, such as cast iron frying pans, such as three or four inches deep and eighteen or more inches across. The recess form of mounting, see Fig. 5, is herein illustrated, although the recesses and tongues are not inclined but are parallel. Herein apertures 426 are elongated. Also as shown in Fig. 4, the major portion of the clamping member is nested in the socket formation and the angular portions 431 thereof are adjacent face 444.

From the foregoing therefore it is clear that the invention may take several forms and all or the major portion only of the clamping member may be nested, the hand grip portion may be integral or detachable, and if detachable, wedge clamped together or bolt clamped together, and when clamped by bolt means the tongues may be of grip embracing or grip seated type. In the forms of the invention with elongated aperture clamping member bearings, the actual clamping contact is more nearly at the junctions of portions 428 and 429 and 328 and 329 than at 28, 128 and 228, as described hereinbefore. This is because of the increased rigidity inherent in the heavy stock clamping members.

While the invention has been illustrated and described in great detail in the drawing and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A detachable handle for a vessel having an upwardly directed side wall with an outwardly directed lug near the top thereof, the lug having top, bottom and side faces, the handle comprising a channel-shaped body, the sides thereof lying immediately exterior to the lug sides, the forward edges of the body sides having abutting engagement with the exterior of the vessel side wall, the intermediate portion of the body uniting the sides thereof and projecting forwardly and overlying the vessel side wall at the top edge thereof, and lip means directed downwardly from the forward edge of the intermediate projecting portion and having predetermined spacing relative to the forward edges of the channel sides to form therewith a downwardly opening groove for vessel side wall reception, said lip means engaging the interior of the vessel side wall near the top thereof, handgrip means extending rearwardly of the body, and a clamping member having outwardly and oppositely directed ends pivotally supported by the body sides appreciably below the aforesaid projecting portion of the body and for vessel lug accommodation therebetween, the mid-portion of the clamping member extending rearwardly relative to said projecting portion, the junctions of said oppositely directed ends and the member being positionable in juxtaposition to the aforesaid body projecting portion, said junctions constituting the lug clamping portions of said member and pressure engaging the bottom of the lug, the member being oppositely tiltable about an axis defined by said member ends for lug clamping and releasing purposes, each of said junctions being of C-shape, the intermediate portion between the C-shaped junctions being of U-shape, and the midportion of the last mentioned intermediate portion constituting a rearwardly directed finger grip.

2. A detachable handle for a vessel having an upwardly directed side wall with an outwardly directed lug near the top thereof, the lug having top, bottom and side faces, the handle comprising a channel-shaped body, the sides thereof lying immediately exterior to the lug sides, the forward edges of the body sides having abutting engagement with the exterior of the vessel side wall, the intermediate portion of the body uniting the sides thereof and projecting forwardly and overlying the vessel side wall at the top edge thereof, and lip means directed downwardly from the forward edge of the intermediate projecting portion and having predetermined spacing relative to the forward edges of the channel sides to form therewith a downwardly opening groove for vessel side wall reception, said lip means engaging the interior of the vessel side wall near the top thereof, handgrip means extending rearwardly of the body, and a clamping member having outwardly and oppositely directed ends pivotally supported by the body sides appreciably below the aforesaid projecting portion of the body and for vessel lug accommodation therebetween, the mid-portion of the clamping member extending rearwardly relative to said projecting portion, the junctions of said oppositely directed ends and the member being positionable in juxtaposition to the aforesaid body projecting portion, said junctions constituting the lug clamping portions of said member and pressure engaging the bottom of the lug, the member being oppositely tiltable about an axis defined by said member ends for lug clamping and releasing purposes, each of said junctions being of C-shape, the intermediate portion between the C-shaped junctions being of U-shape, the central portion of said U-shape being offset downwardly and rearwardly, the hand grip means terminating in juxtaposition to the last mentioned downward offset and engageable thereby, the immediate mid-portion of said U-shaped intermediate portion constituting a rearwardly directed finger grip.

3. A handle structure as defined by claim 2 wherein the channel-shaped body at its lower edges has inwardly directed flanges confronting each other constituting therewith a tubular-like socket for telescopic reception of the hand grip means, the downward offsetting of the clamping member constituting a hand grip means retainer for hand grip means retention in said socket.

4. A handle structure as defined by claim 2 wherein the channel-shaped body at its lower edges has inwardly directed flanges confronting each other constituting therewith a tubular-like socket for telescopic reception of the hand grip means, the sides of said body being inclined toward each other and toward the hand grip means, the resulting socket being of tapering character and the hand grip means having a complementary formation receivable thereby, the downward offsetting of the clamping member constituting a pressure lock for effecting wedging and locking engagement between said socket and said complementary formation of the hand grip means.

JAMES H. REICHART.